(12) United States Patent
Puhl

(10) Patent No.: US 7,516,799 B2
(45) Date of Patent: Apr. 14, 2009

(54) APPARATUS FOR THE TREATMENT OF HORN SPLITS OR CRACKS ON THE HOOF OF HORSES OR OTHER HOOFED ANIMALS

(76) Inventor: Michael Puhl, Prof.-Peter-Wust-Straβe 32a, D-66679 Losheim am See (DE)

( * ) Notice: Subject to any disclaimer, the term of this patent is extended or adjusted under 35 U.S.C. 154(b) by 0 days.

(21) Appl. No.: 11/606,515

(22) Filed: Nov. 30, 2006

(65) Prior Publication Data

US 2007/0125556 A1 Jun. 7, 2007

(30) Foreign Application Priority Data

Dec. 2, 2005 (DE) .................. 10 2005 057 782

(51) Int. Cl.
*A01L 15/00* (2006.01)
*A61B 17/08* (2006.01)
(52) U.S. Cl. .................. 168/45; 606/212
(58) Field of Classification Search .......... 168/19, 168/47, 45; 606/212
See application file for complete search history.

(56) References Cited

U.S. PATENT DOCUMENTS

| | | | | |
|---|---|---|---|---|
| 309,690 A | * | 12/1884 | Carroll | 606/212 |
| 376,441 A | * | 1/1888 | Hughes | 606/212 |
| 380,093 A | * | 3/1888 | Cruice et al. | 606/212 |
| 408,080 A | * | 7/1889 | Carroll | 606/212 |
| 730,483 A | * | 6/1903 | Schwartz | 168/19 |
| 4,723,540 A | * | 2/1988 | Gilmer, Jr. | 606/75 |
| 5,626,610 A | * | 5/1997 | Janke | 606/212 |
| 6,540,769 B1 | * | 4/2003 | Miller, III | 606/216 |

FOREIGN PATENT DOCUMENTS

DE 417 110 8/1925

* cited by examiner

*Primary Examiner*—Son T. Nguyen
(74) *Attorney, Agent, or Firm*—Friedrich Kueffner

(57) ABSTRACT

The invention relates to an apparatus for the treatment of horn splits or cracks on the hoof of horses or other hoofed animals. The apparatus according to the invention is characterized by holding parts (1, 1') for fastening to the longitudinal sides of a horn split or crack so as to be situated one opposite the other on the hoof and is further characterized by devices (3-14) which connect the holding parts (1, 1') and by which the distance between the holding parts (1, 1') is adjustable, causing the horn split or crack to be widened or narrowed.

9 Claims, 1 Drawing Sheet

APPARATUS FOR THE TREATMENT OF HORN SPLITS OR CRACKS ON THE HOOF OF HORSES OR OTHER HOOFED ANIMALS

BACKGROUND OF THE INVENTION

1. Field of the Invention

The invention relates to an apparatus for the treatment of horn splits or cracks on the hoof of horses or other hoofed animals.

2. Description of the Related Art

Through use, repair kits or treatment kits are known by which the split or crack can be stabilized and fixed by gluing together of the horn walls situated one opposite the other in a horn split or crack.

It is further known to treat horn splits by wiring, similarly to the laced shoe principle, and thus to narrow and stabilize the split by tensioning of the wire. In addition, the mutually opposing walls of the split are glued together.

Another known option for treating a horn split consists in screwing a perforated metal plate over the split in order to fix the split in the existing width.

SUMMARY OF THE INVENTION

The object of the present invention is to provide a new apparatus of the type mentioned in the introduction, which offers further options for the treatment of hoof defects.

The apparatus according to the invention which achieves this object is characterized by holding parts for fastening to the longitudinal sides of a horn split or crack so as to be situated one opposite the other on the hoof and is further characterized by devices which connect the holding parts and by which the distance between the holding parts is adjustable, causing the horn split or crack to be widened or narrowed.

Advantageously, the apparatus according to the invention allows horn splits to be not only drawn together, but also widened. Painful pinchings of the hoof corium in such splits can thus be remedied.

In a preferred embodiment of the invention, the connecting devices comprise a threaded rod which extends from holding part to holding part and engages with at least one end in a thread on one of the holding parts.

Whilst the threaded rod is configured without a thread at the other end and could be rotatably mounted on the other holding part, it preferably engages on the other holding part in a thread also. Accordingly, the threaded rod is provided with a left-hand thread at one end and with a right-hand thread at the other end.

Between the left-hand thread and the right-hand thread a turning ring can be fitted, which has, for example, intersecting bores for the reception of a lever tool that turns the threaded rod.

Preferably, the holding parts are mutually displaceable in a guide, which guide ensures that the holding parts are moved apart along a straight path, particularly when the holding parts are pressured by the connecting device.

In one embodiment of the invention, the guide has guide rods which extend from holding part to holding part and which respectively engage with at least one end in a guide bore on one of the holding parts. Expediently, the guide rods engage at both ends in such a guide bore.

The holding parts can respectively consist by a plate and a block-like metal body which is attached to the plate and contains the threaded bores and/or guide bores. Expediently, the plates are bent in accordance with the shape of the hoof and contain throughbores for the fastening, for example screw fastening, to the hoof.

The invention is explained in greater detail below with reference to an illustrative embodiment and the appended drawings relating to this illustrative embodiment, wherein:

DETAILED DESCRIPTION OF THE INVENTION

Figure 1:
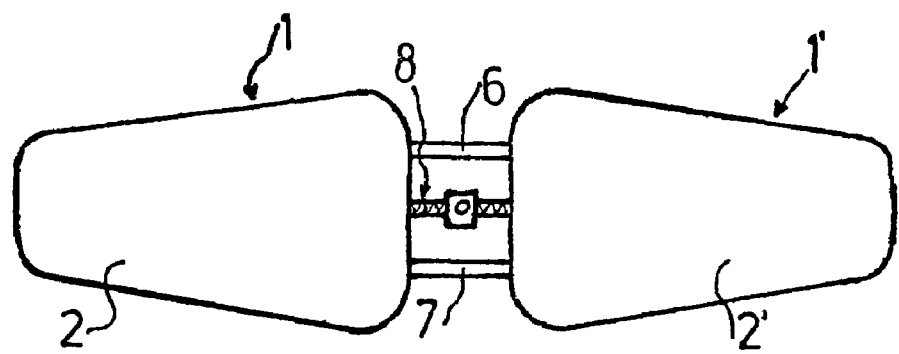
FIG. 1 shows an apparatus according to the invention in a front view.
Figure 2:
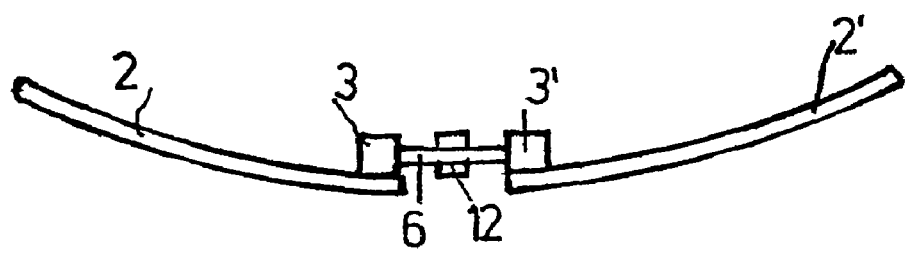
FIG. 2 shows the apparatus of FIG. 1 in a side view.

A clamp-like apparatus for the treatment of horn splits, for attachment to the front side of a hoof, has two holding parts 1 and 1'. The holding parts respectively comprise a thin plate 2 and 2' and a narrow metal body 3 and 3' attached to the plate on the side facing the hoof.

Extending from holding part to holding part are two guide rods 6 and 7 and a threaded rod 8.

The guide rods 6 and 7 engage with one end in a respective guide bore 4 and 5 in the metal body 3 and with the other end in a respective guide bore 4' and 5' in the metal body 3'.

The threaded rod 8 is screwed with a portion 10 bearing a right-hand thread into a right-threaded bore 14 in the metal body 3 and with a portion 11 bearing a left-hand thread into a left-threaded bore 14' in the metal body 3'.

Located between the portions 10 and 11 of the threaded rod 8 is a turning ring 12, which has intersecting throughbores 13.

In the illustrative embodiment shown, the metal bodies 3 and 3' are arranged in parallel and with their longitudinal sides flush with the mutually opposing edges of the holding parts and plates.

Figure 3:
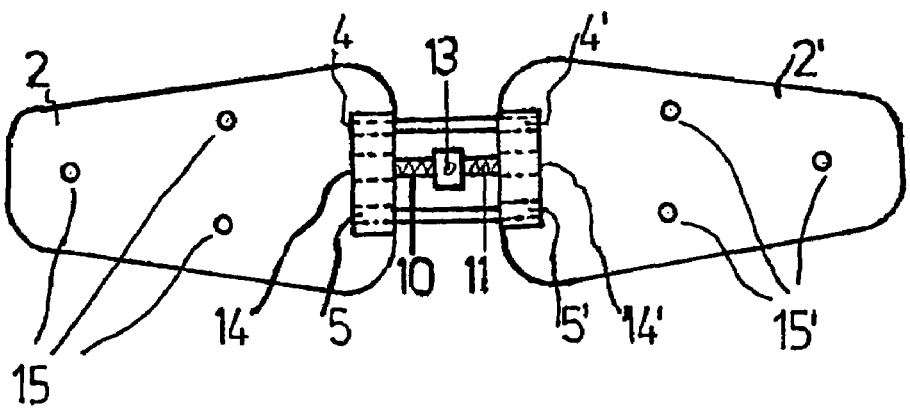
FIG. 3 shows the apparatus of FIG. 1 and 2 in a rear view.

The plates 2 and 2' have throughbores 15 AND 15' for a screw or nail fastening to the hoof as illustrated in FIG. 3.

For the treatment of a horn split, the holding parts 1 and 1' are fastened to the hoof, for example by screwing or gluing of the plates 2 and 2' to the hoof, with the horn split running between the holding parts 1 and 1'. Expediently, mutually opposing recesses for the reception of the metal bodies 3 and 3' are formed on the horn split. The plates can thus bear against the hoof with the whole of their surface.

With the aid of a tool engaging in one of the throughbores 13 on the turning ring 12, the threaded rod 8 can be rotated, the distance between the holding parts 1 and 1' increasing or diminishing according to the direction of rotation. This apparatus can consequently be used to widen or narrow the horn split situated between holding parts.

Widenings enter into consideration, in particular, for the relief of painful pinchings of the hoof corium in the horn split. If the split is narrowed, the apparatus remains on the hoof at least until an adhesive introduced, where necessary, into the narrowed split has set.

The apparatus can be readily reused.

As a departure from the illustrative embodiment shown, the plates of the holding parts could be larger and more than just one metal body could be attached thereto. The number of guide rods and threaded rods could be increased accordingly.

The invention claimed is:

1. Apparatus for the treatment of horn splits or cracks on the hoof of horses or other hoofed animals, comprising holding parts (1, 1') for fastening to the longitudinal sides of a horn split or crack so as to be situated one opposite the other on the hoof, and further comprising connecting devices (3-14) for connecting the holding parts (1, 1') and for adjusting the distance between the holding parts (1, 1') the distance being adjustable by widening the horn split or, wherein the connecting devices comprise a threaded rod (8) which extends from holding part (1) to holding part (1') and engages at least one end in a threaded bore (14, 14') on one of the holding parts (1, 1'); wherein the holding parts (1, 1') are mutually displaceable in a guide (3-7); and wherein the guide (3-7) comprises guide rods (6, 7) which extend from holding part (1) to holding part (1') and which respectively engage with at least one end in a guide bore (4, 5; 4', 5') on one of the holding parts (1, 1').

2. Apparatus according to claim 1, wherein the threaded rod (8) has a left-hand thread at one end and a right-hand thread at the other end.

3. Apparatus according to claim 2, wherein the threaded rod (8) has a turning ring (12) between the left-hand thread and the right-hand thread.

4. Apparatus according to claim 3, wherein the turning ring (12) has intersecting bores (13).

5. Apparatus according to claim 1, wherein the holding parts (1, 1') can respectively be formed by plates (2, 2') and at least one block-like metal body (3, 3').

6. Apparatus according to claim 5, wherein the at least one metal body (3, 3') contains the threaded bore (14, 14') and/or the guide bores (4, 5; 4', 5').

7. Apparatus according to claim 5, wherein the plates (1, 1') are bent in accordance with the shape of the hoof and, where necessary, contain throughbores for a screw or nail connection to the hoof.

8. Apparatus according to claim 5, wherein the at least one metal body (3, 3') is arranged with a longitudinal side flush with the mutually opposing edges of the plates.

9. The apparatus according to claim 1, wherein the distance is adjustable by narrowing the horn split or crack.

* * * * *